(12) United States Patent
Causo et al.

(10) Patent No.: US 10,733,489 B2
(45) Date of Patent: Aug. 4, 2020

(54) OPTICALLY READABLE TAGS AND METHODS AND SYSTEMS FOR DECODING AN OPTICALLY READABLE TAG

(71) Applicant: Nanyang Technological University, Singapore (SG)

(72) Inventors: Albert Jacinto Causo, Singapore (SG); Ramamoorthy Luxman, Singapore (SG); I-Ming Chen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 16/349,610

(22) PCT Filed: Nov. 17, 2017

(86) PCT No.: PCT/SG2017/050572
§ 371 (c)(1),
(2) Date: May 13, 2019

(87) PCT Pub. No.: WO2018/093333
PCT Pub. Date: May 24, 2018

(65) Prior Publication Data
US 2019/0279060 A1 Sep. 12, 2019

(30) Foreign Application Priority Data
Nov. 17, 2016 (SG) .......................... 10201609661V (51) Int. Cl.
*G06K 19/06* (2006.01)
*G06K 7/14* (2006.01)
*G09C 1/00* (2006.01)

(52) U.S. Cl.
CPC ..... *G06K 19/06028* (2013.01); *G06K 7/1404* (2013.01); *G06K 19/06093* (2013.01); *G09C 1/00* (2013.01)

(58) Field of Classification Search
CPC ................................................. G06K 19/06028
(Continued)

(56) References Cited

U.S. PATENT DOCUMENTS 2,612,994 A 10/1952 Woodland et al.
5,243,655 A 9/1993 Wang
(Continued)

FOREIGN PATENT DOCUMENTS

| CN | 101398907 A | 4/2009 |
| CN | 105279539 A | 1/2016 |
| WO | 2018093333 A1 | 5/2018 |

OTHER PUBLICATIONS

Foreign Communication from a Related Counterpart Application, International Search Report and Written Opinion dated Feb. 6, 2018, International Application No. PCT/SG2017/050572 filed on Nov. 17, 2017.
(Continued)

*Primary Examiner* — Allyson N Trail (57) ABSTRACT

An optically readable tag and methods and systems for decoding the optically readable tag are disclosed. The optically readable tag comprises: a border region having an indicative shape; and an encoding region, defined by the border region, the encoding region comprising a plurality of encoding shape objects, wherein data is encoded by relative sizes of the encoding shape objects.

20 Claims, 6 Drawing Sheets

(58) Field of Classification Search
USPC .................................................. 235/494, 492
See application file for complete search history.

(56) References Cited

U.S. PATENT DOCUMENTS

| | | |
|---|---|---|
| 5,726,435 A | 3/1998 | Hara et al. |
| 7,444,296 B1 * | 10/2008 | Barber ................. G06Q 10/087 |
| | | 194/205 |
| 9,111,164 B1 * | 8/2015 | Anderton ............. G06K 7/1443 |

OTHER PUBLICATIONS

Kato, H. et al., Pervasive 2D barcodes for Camera Phone Applications. IEEE Pervasive Computing: Mobile and Ubiquitous Systems, Oct. 15, 2007, vol. 6, No. 4, pp. 76-85 [Retrieved on Jan. 11, 2018] <DOI: 10.1109/MPRV.2007.80>.

* cited by examiner

OPTICALLY READABLE TAGS AND METHODS AND SYSTEMS FOR DECODING AN OPTICALLY READABLE TAG

CROSS-REFERENCE TO RELATED APPLICATIONS

The present application is a filing under 35 U.S.C. 371 as the National Stage of International Application No. PCT/SG2017/050572, filed Nov. 17, 2017, entitled "OPTICALLY READABLE TAGS AND METHODS AND SYSTEMS FOR DECODING AN OPTICALLY READABLE TAG," which claims priority to Singapore Application No. SG 10201609661V filed with the Intellectual Property Office of Singapore on Nov. 17, 2016, both of which are incorporated herein by reference in their entirety for all purposes.

TECHNICAL FIELD

The present disclosure relates to optically readable tags and in particular to optically readable tags that can be identified and read from variable distances.

BACKGROUND

Optically readable tags are markers containing specific patterns or geometric primitives that can be detected and read by an optical sensor such as a camera. One application of optically readable tags is to allow the identification of items in scenarios such as warehouses, for example, in an electronic commerce fulfillment center, or in archives such as a library. Optically readable tags allow items such as boxes, packages, books or shelves to be quickly identified in an automated manner.

In recent years, the above scenarios are increasing becoming automated, with robotic pickers automatically fulfilling electronic commerce orders. Therefore, there is increasing demand for optically readable tag systems.

Examples of existing two-dimensional visual marker systems include Barcodes, which are described in U.S. Pat. No. 2,612,994, PDF417 type, stacked linear barcodes which are described in U.S. Pat. No. 5,243,655, Quick Response Codes (QR Codes) by Denso Wave which are described in U.S. Pat. No. 5,726,435, High Capacity Color Barcode (HCCB) by Microsoft, DataMatrix, Aztec Code, and Maxi-Code. These markers are mainly intended to carry as much information as possible. However, they can be decoded only at a close distance and are ill-suited for long distance decoding. Here, close distance means a distance of <20 cm. To scan through each and every item utilising such codes is a tedious and time-consuming process.

In scenarios such as electronic commerce fulfillment and inventory management, for example in a library, there is a demand for markers that can be read at variable distances, for example from 20 cm to 150 cm. There is also a requirement for a marker system that can be read from a range of distances and camera orientations. Many of the marker systems discussed above are only readable within a short distance and with specific camera orientations relative to the marker.

SUMMARY OF THE INVENTION

According to a first aspect of the present disclosure an optically readable tag comprises: a border region having an indicative shape; and an encoding region, defined by the border region, the encoding region comprising a plurality of encoding shape objects, wherein data is encoded by relative sizes of the encoding shape objects.

The optically readable tag can be read by capturing an image of a scene comprising the optically readable tag. An advantage of embodiments of the present disclosure is that the optically readable tags can be read from different distances and have a tolerance to skew angles of the optically readable tags relative to the camera or image capture device.

In an embodiment, the border region comprises an outline of the indicative shape against a contrasting background. This allows the optically readable tag to be easily identified. For example, the border region may comprise a white outline of the indicative shape against a black background.

In some embodiments, the indicative shape is a rectangle. In some embodiments the border region encloses the encoding region.

In some embodiments the encoding shape objects are circular objects. This allows for easy processing and identification of the encoding shape objects. It also provides for tolerance to image skew.

The data may be encoded as binary data or ternary data. If the data is encoded as to binary data then the encoding shape objects have either a first size or a second size. If the data is encoded as ternary data then the encoding shape objects have either a first size, a second size or a third size. The ratio the ratio of the first size to the second size is at least 1:1.5 in some embodiments.

In some embodiments, the plurality of encoding shape objects comprises a reference marker and data is encoded by the sizes of the encoding shape objects relative to the reference marker. The reference marker may indicate a start point of an encoding sequence of the encoding shape objects.

According to a second aspect of the present disclosure a method of decoding data encoded on an optically readable tag is disclosed. The method comprises: receiving an image of a scene comprising at least one optically readable tag; identifying contours in the image; detecting a border region; determining relative sizes of encoding shape objects within an encoding region defined by the border region; and decoding data encoded on the optically readable tag from the relative sizes of the encoding shape objects.

The method may be used to identify and decode multiple optically readable tags in the same image.

The border region may be detected by an indicative shape. Alternatively, the border region may be detected by identifying vertices of a border region.

In an embodiment the method further comprises determining that a candidate region corresponding to the border region having the indicative shape is an optically readable tag.

In an embodiment determining that the candidate region is an optically readable tag comprises determining a number of encoding shape objects within the encoding region and comparing the number of encoding shape objects with an expected number of encoding shape objects in an optically readable tag.

In an embodiment determining the relative sizes of the encoding shape objects comprises identifying a reference shape object and comparing the sizes of the encoding shape objects with the size of the reference shape object.

In an embodiment wherein identifying contours in the image comprises applying an edge detection algorithm to the image. The edge detection algorithm may be the canny edge detection algorithm.

According to a third aspect of the present disclosure, a computer readable medium carrying computer executable instructions which when executed on a processor cause the processor to carry out a method of decoding an optically readable tag is provided.

According to a fourth aspect of the present disclosure a system for decoding an optically readable tag is provided. The system comprises a processor and a storage device. The storage device stores computer program instructions for causing the processor to: receive an image of a scene comprising at least one optically readable tag; identify contours in the image; detect a border region having an indicative shape; determine relative sizes of encoding shape objects within an encoding region defined by the border region; and decode data encoded on the optically readable tag from the relative sizes of the encoding shape objects.

BRIEF DESCRIPTION OF THE DRAWINGS

In the following, embodiments of the present invention will be described as non-limiting examples with reference to the accompanying drawings in which.

DETAILED DESCRIPTION

Figure 1:
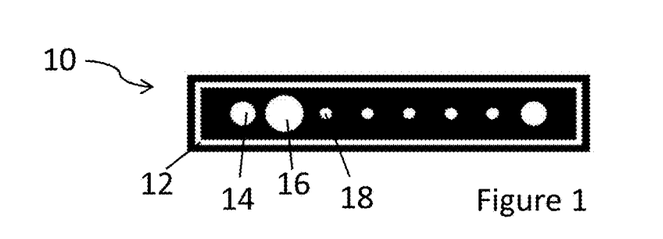
FIG. 1 shows an optically readable tag according to an embodiment of the present invention.

FIG. 1 shows an optically readable tag according to an embodiment of the present invention. The optically readable tag 10 comprises a border region 12 which encloses an encoding region. The border region 12 has an indicative shape which in this embodiment is a rectangle. The border region 12 comprises the indicative shape against a contrasting background. The encoding region comprises a plurality of encoding shape objects 14, 16 and 18. In this embodiment, the encoding shape objects are circles. The encoding shape objects 14, 16 and 18 have different sizes. In the embodiment shown in FIG. 1 there are intermediate sized circles 14, large circles 16 and small circles 18. The relative sizes of the encoding shape objects 14, 16 and 18 encodes data. This encoded data can be read from the optically readable tag 10 by determining the relative sizes of the encoding shape objects 14, 16 and 18. The optically readable tag 10 uses a black and white color scheme as edge and contour detection are applied to identify and read the optically readable tag 10.

The relative sizes of the encoding shape objects indicating different values may be greater than 1:1.5 to allow efficient decoding of the optically readable tags.

Figure 2:
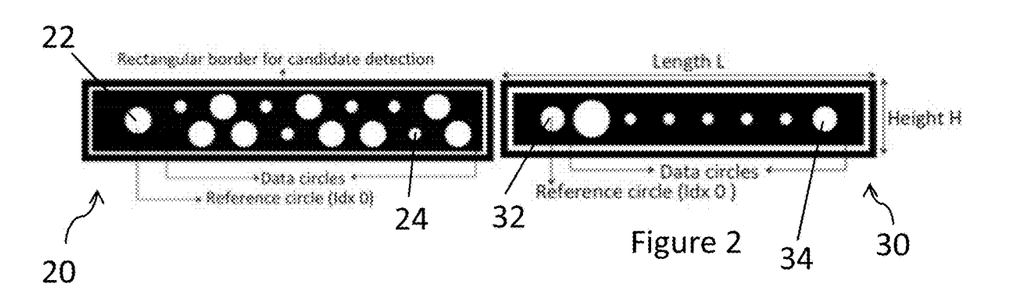
FIG. 2 shows a dense layout and a sparse layout for optically readable tags according to embodiments of the present invention.

FIG. 2 shows a dense layout and a sparse layout for optically readable tags according to embodiments of the present invention. The tag 20 having a dense layout of encoding shapes has two rows of data circles 24 located one above the other. In this example, the encoding region also comprises a reference circle 22 which is located at the left hand end of the encoding region in the vertical center of the tag 20.

The tag 30 having a sparse layout of encoding shapes has a single row of data circles 34. As with the tag 20 having dense layout of encoding shapes, the encoding region also comprises a reference circle 32 at the left hand end.

In FIG. 2, the reference circles 22 and 32 have index (Idx) 0 indicating that the decoding of the tag starts from the respective reference circle.

It is noted that the tag 30 may be decoded differently if it is rotated through 180 degrees. In order to achieve full rotational invariance a reference circle may be placed at a specific position in the marker not in alignment with any of the remaining (data) circles like in the case of tag 20 having a dense layout.

As shown in FIG. 2, the tags have a length L and a height H. The ratio of H to L may be used to identify the indicative shape of the border region of the tags. In one example, the dimensions of the tag are 6 cm×2 cm. The border region is used to detect shapes as candidates for optically readable tags.

It is envisaged that the optically readable tags may have largest dimension in the range 2 cm to 10 cm.

It is envisaged that the layout could be changed to increase the number of circles to encode more data in the same rectangle size. However, doing so could affect the readability of the optically readable tag because the maximum size of the circles is lower. The trade-off would depend largely on the intended use or requirement of the application. If longer readability range is important, sparse layout is recommended; otherwise more data could be encoded in a dense layout. Table 1 below shows the amount of data that could be encoded given the layout. The table is based on a marker that is only 6 cm×2 cm in dimension, a larger marker would extend the readability range. The range is also determined by the resolution of the camera used. A higher resolution camera is capable of capturing finer details and hence, can be used for longer range applications.

TABLE 1

Comparison of ternary and binary encoded optically readable tags with sparse and dense layout. For comparison purposes, the marker size in this test was set at 6 cm × 2 cm.

| Encoding | Layout | Minimum Detectable Size (pixels) | Maximum Readability Range (marker size: 6 cm × 2 cm) | Data capacity | Rotational Invariant |
|---|---|---|---|---|---|
| Ternary | Dense | 30 × 15 | 100 cm | 14 data length $3^{14}$ possible values | Yes |
| Binary | Dense | 30 × 15 | 100 cm | 14 data length $2^{14}$ possible values | Yes |
| Ternary | Sparse | 30 × 10 | 150 cm | 7 data length $3^{7}$ possible values | Yes |
| Binary | Sparse | 30 × 10 | 150 cm | 7 data length $2^{7}$ possible values | Yes |

The optically readable tags could be encoded in binary or ternary systems. The strategy used for encoding is based on the size of the circles. The diameter of each detected data circles is compared to the reference circle. Thus, a data circle could be either larger than or smaller than the reference, or have the same size as the reference.

In ternary encoding the larger circle represents a bit value of 2 whereas the smaller circle represents a bit value of 0. Circles of an intermediate size (i.e. an equal size to the reference circle) represent a bit value of 1. In binary encoding, smaller circle represents the bit value of 0 and others represent 1.

Table 1 shows the comparison of optically readable tags in both encoding systems and layouts. By changing the relative sizes of the circles, the encoding could be changed, and conversely, the amount or type of data that could be encoded by the optically readable tags.

Circles are preferably used as the identification markers as they are easy to identify and process in a computer algorithm and has no issue with the orientation of the tag. Other simple shapes such as a square may also be used.

Figure 3:
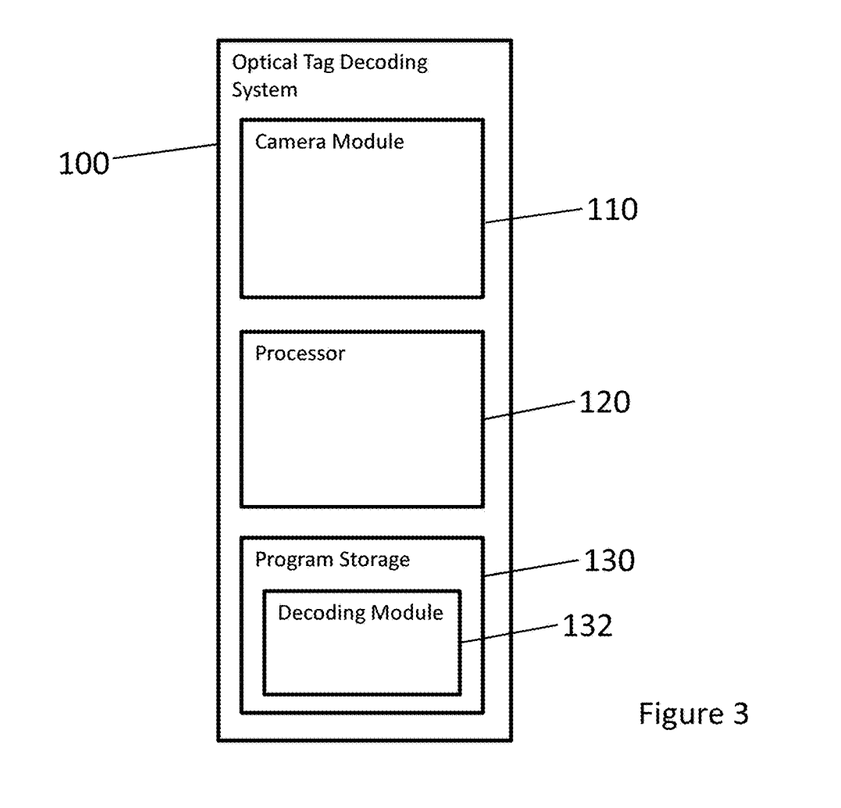
FIG. 3 is a block diagram showing an optical tag decoding system according to an embodiment of the present invention.

FIG. 3 is a block diagram showing an optical tag decoding system according to an embodiment of the present invention. It is envisaged that the system 300 may be implemented as a generic computing device such as a smartphone or a tablet computer running a software application or as a device specifically produced to decode optically readable tags. The system 300 may be incorporated into an automated device such as a robot picker in a warehouse.

The system comprises a camera module 110 which is operable to capture images of a scene. The system further comprises a processor 120 which is operable to execute computer readable instructions and a memory or program storage 130 which stores a decoding module 132 of computer executable code. The system 300 may further comprise an output module such as a screen to output data decoded from the optically readable tags. The system 300 may further comprise features of an automated device such as control circuitry for an automated picker robot.

The camera module may be implemented as a Stereo Labs ZED camera having 2560×720 pixel resolution, FOV: 110° (D) max. F/2.0 aperture. Such a camera was found to be able to read ternary marker tags having dimension of 7 cm×4.95 cm in sparse layout at a distance of 60 cm.

Figure 4:
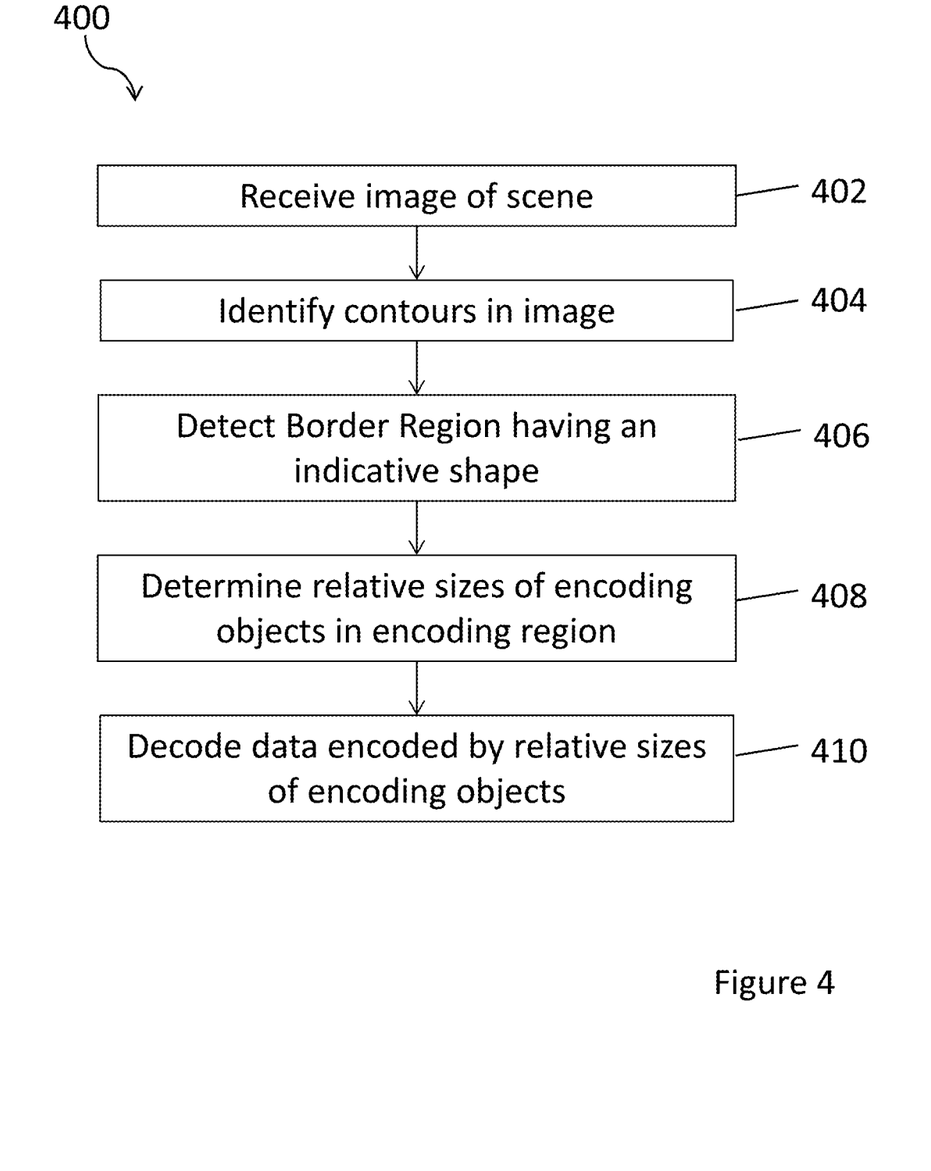
FIG. 4 is a flowchart showing a method of decoding an optically readable tag according to an embodiment of the present invention.

FIG. 4 is a flowchart showing a method of decoding an optically readable tag according to an embodiment of the present invention. The method 400 may be carried out by the system 300 shown in FIG. 3.

The method 400 shown in FIG. 4 may be implemented as an algorithm in a continuous loop with the camera's capture images serving as the input. This loop contains loops within to identify and decode the markers in a single camera frame at a time. The algorithm is synchronized with the camera frame rate.

In step 402, the processor 120 receives an image of a scene captured by the camera module 110. The scene may include one or more optically readable tags described above.

In step 404, the processor 120 identifies contours in the image. The contours may be identified by an edge detection algorithm such as the canny edge detection algorithm. Once the edges are detected, these are used to form contours in the image. These contours are then considered as candidates for optically readable tags in the image.

In step 406, border regions having the indicative shape are identified by the processor 120. The algorithm identifies all the rectangular contours in the edge image as potential optically readable tags. These contours are registered and indexed in an array. In some embodiments, recognition of all the in-lying contours of each indexed rectangular contours is then carried out. The rectangles are verified as optically readable tags through the exact number of encoding circles in the encoding region defined by the border.

In step 408, the processor determines the relative sizes of the encoding circles in the encoding region. Step 408 may comprise identifying the reference circle and comparing the size of each of the other circles in the encoding region with the reference circle in turn. As discussed above, the encoded data may be binary data or ternary data. In some embodiments the encoding circles may have sizes selected from two possible sizes: equal to the reference circle and smaller than the reference circle. Alternatively, the sizes may be selected from larger than and smaller than the reference circle. When the encoded data is ternary data, the encoding circles have sizes selected from three possible sizes these may be: larger than, equal to, and smaller than the reference circle.

The sequence of reading the encoding circles in step 408 may be determined from the position of the reference circle in the optically readable tag.

In step 410, the processor decodes the encoded data from the relative sizes of the encoding objects which in this example are encoding circles.

Figure 5:
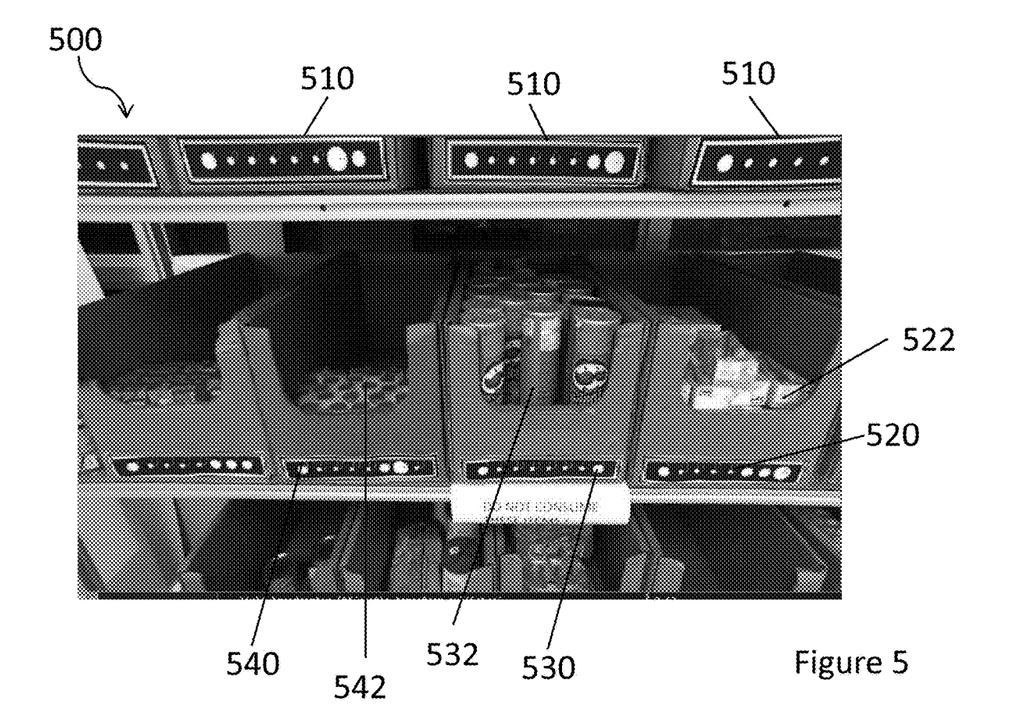
FIG. 5 is an example of a scene including a plurality of optically readable tags.

FIG. 5 is an example of a scene including a plurality of optically readable tags. The scene 500 shown in FIG. 5 may be the input into the method 400 shown in FIG. 4.

As shown in FIG. 5, the scene includes a plurality of optically readable tags 510. Each of the optically readable tags is attached to a box. An optically readable tag 520 is attached to a box 522 of juice cartons, an optically readable tag 530 is attached to a box 532 of tubes of crisps and an optically readable tag 540 is attached to a box 542 of bottles of yogurt drinks. As described above in relation to FIG. 4, the optically readable tags are identified in the image by identifying the indicative shape of the border region. In this example, the indicative shape is a rectangle having a specific aspect ratio. The optically readable tags may also be identified by determining the number of encoding shapes within the encoding region. In this example, the encoding region of each optically readable tag includes 8 encoding shapes. In this example, the encoding shapes are circles.

Figure 6A:
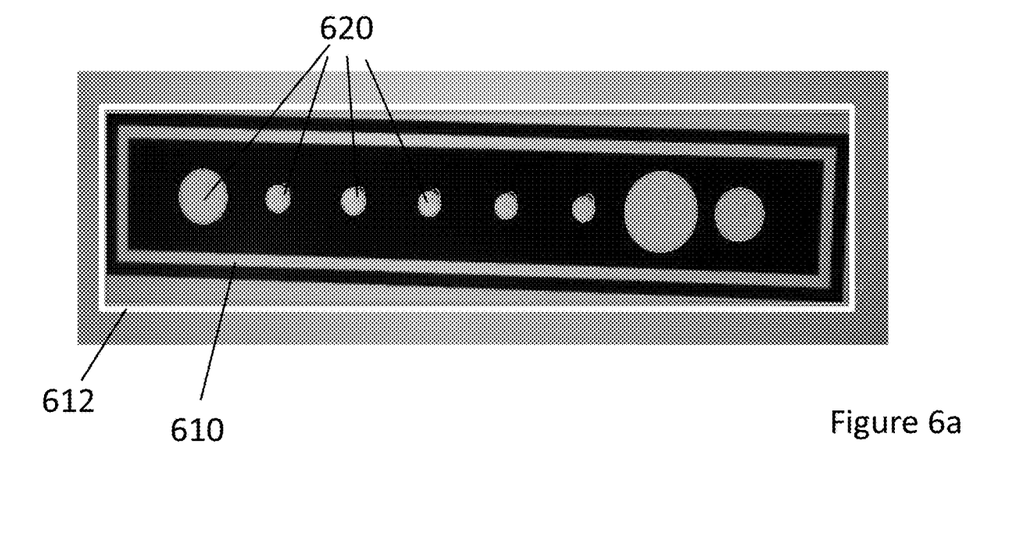
FIG. 6a shows a close up view of an identified optically readable tag.

FIG. 6a shows a close up view of an identified optically readable tag. The border region 610 of the tag is identified against the contrasting background. FIG. 6 shows a boundary 612 around the identified optically readable tag. It is noted that the tag is skewed with respect to the boundary. One of the advantages of embodiments of the present invention is that the optically readable tags can be read even if they are at a skewed angle. As shown in FIG. 6a, the optically readable tag includes 8 encoding circles. The presence of 8 encoding shapes may be used to identify the optically readable tag. As described above, in some embodiments, all contours which approximate the indicative shape, which in this case is a rectangle having a specific aspect ratio are identified as candidate optically readable tags. Then optically readable tags are determined from the candidate optically readable tags using the number of encoding shapes within the border region.

Figure 6B:
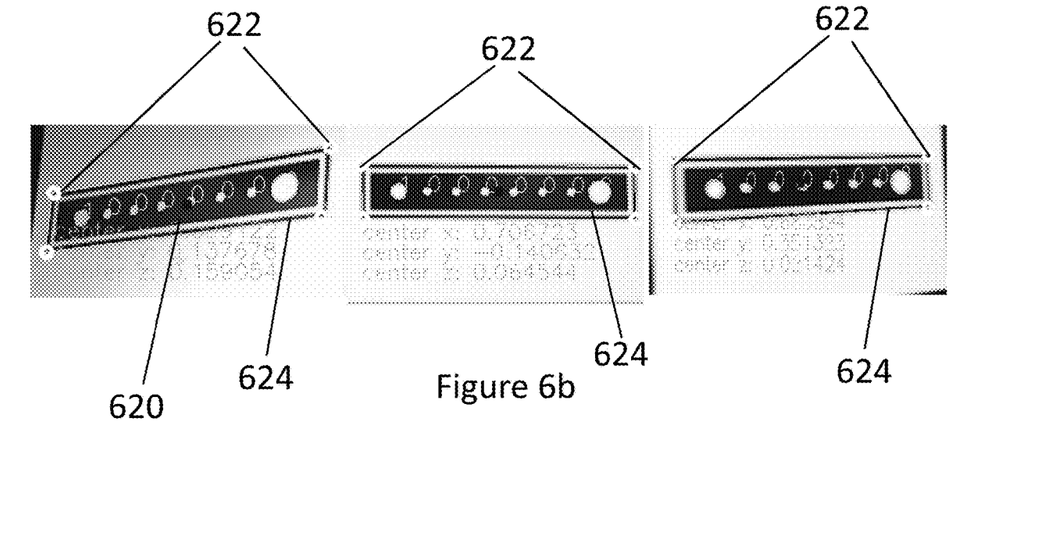
FIG. 6b illustrates a method of identifying an optically readable tag according to an embodiment of the present invention.

FIG. 6b illustrates an alternative method of identifying an optically readable tag 620. To make the method robust to perspective changes, the marker boundary is detected in a different way to that described above with reference to FIG. 4. The problem of perspective changes may be very pronounced in polyhedral markers (rectangular or square) as the boundary becomes a parallelogram due to camera's perspective.

As shown in FIG. 6b, to solve this problem, the boundary vertices 622 are identified instead of the boundary 624 itself. We can then determine the actual boundary 624 based on these vertices 622. This provides better accuracy in determining the 3D orientation of the marker compared to orientation determination of the boundary using the approximate rectangle. Then the markers are identified and decoded as described above with reference to FIG. 4.

In the embodiments described above, the optically readable tags are rectangular. However optically readable tags of other shapes are envisaged.

Figure 7A:
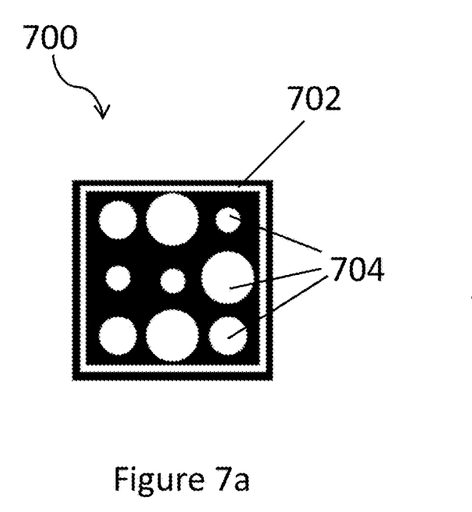
FIGS. 7a and 7b show square optically readable tags according to embodiments of the present invention.
Figure 7B:
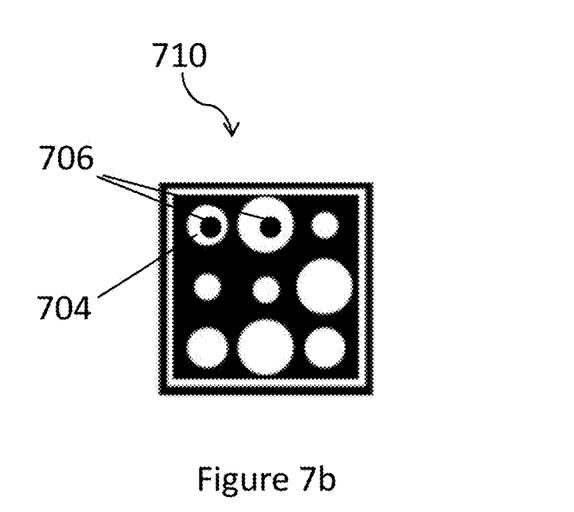

FIGS. 7a and 7b show square optically readable tags according embodiments of the present invention. As shown in FIG. 7a, the optically readable tag 700 has a square border region 702 which comprises the outline of a square against a contrasting background. The square border region 702 encloses an encoding region which comprises nine encoding shape objects 704. In this embodiment the encoding shape objects are circles.

As shown in FIG. 7b, an optically readable tag 710 has orientation markers 706 arranged inside some of the encoding shape objects 704. These orientation markers 706 allow the orientation of the optically readable tag 710, and/or the start position for reading the optically readable tag to be identified. As shown in FIG. 7b, the orientation markers 706 are circles arranged at an off-center position within the encoding shape objects 704.

Figure 8A:
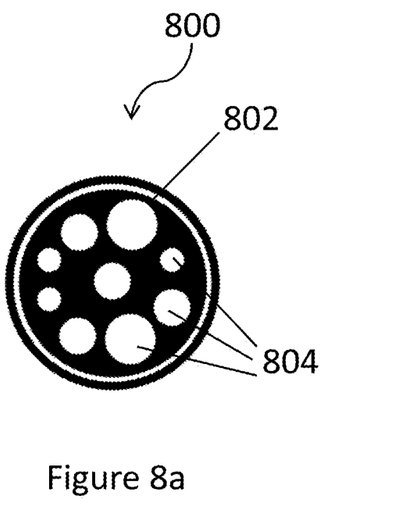
FIGS. 8a and 8b show circular optically readable tags according to embodiments of the present invention.
Figure 8B:
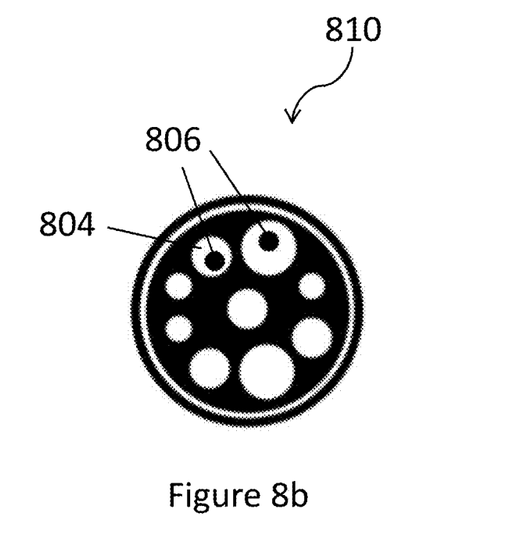

FIGS. 8a and 8b show circular optically readable tags according to embodiments of the present invention. As shown in FIG. 8, the optically readable tag 800 has a circular border region 802 which comprises the outline of a circle against a contrasting background. The circular border region 802 encloses an encoding region which comprises nine encoding shape objects 804. In this embodiment the encoding shape objects are circles.

As shown in FIG. 8b, an optically readable tag 810 has orientation markers 806 arranged inside some of the encoding shape objects 804. These orientation markers 806 allow the orientation of the optically readable tag 810, and/or the start position for reading the optically readable tag to be identified.

The orientation markers may indicate which encoding shape object acts a reference marker, alternatively, the position of one of the encoding shape objects may determine which encoding shape object acts as a reference marker, for example the center shape object may act as the reference marker.

Optically readable tags according to the present disclosure have a number of advantages. In many scenarios, markers should be identifiable and detectable as far from the camera as possible. Unfortunately, this is not the case with many existing markers. The optical readable tags described herein have much higher readability range than other markers. By using the relative sizes of the shape primitives with respect to a reference increases the reliability of the optically readable tags. When the marker reader (i.e., a camera) is near, the circles appear closer and bigger, but their sizes relative to each other remain constant. The same is true when the marker reader is far from the marker. With this new approach it is possible to stretch the readability range to almost 4 times the existing marker system of similar size.

Existing markers also have to be decoded by subdividing the detected marker into bins and doing binary interpolation. This is prone to higher error rate due to noise and loss of bin information due to occlusion, etc. However, for the optically readable tags of the present disclosure, the rectangular inner borders make it easy to find the circle patterns even if the markers are skewed (rotated). Then information is decoded by comparing the size of the detected circle with the reference circle. This decoding process results in high reliability and accuracy in identification and decoding.

Many existing markers come with a fixed encoding system, which could potentially limit what data they could encode. Optically readable tags of the present disclosure potentially have more information carrying capacity when compared with other standard markers like QR codes and barcodes. For example, in ternary encoding method, the optically readable tags of the present disclosure can have n! unique codes, where n is the number of encoding circles.

The optically readable tags use encoding shapes such as circles with different relative diameters to represent any data combination. In the current usage, circles with three (3) different relative radii are used that allow encoding of ternary data, such as bits 0, 1, and 2. However, the same pattern could also be encoded as a binary data. Furthermore, the data decoding could be changed to allow for higher bit-rate (from binary to ternary or even more).

Several different input methodologies are envisaged. These methods may be used to capture input when using in order to identify items (boxes, books, etc):

1. Using a single camera—This is the default mode. In order to capture more than one marker at a time, the distance between the camera and the boxes with the optically readable tags can be adjusted.

2. Using multiple cameras—Suitable for scanning a wider area than what a single camera can capture without moving too far from the items or shelf. The captured images can be stitched together using standard image processing methods. Then the stitched image can be processed as usual.
3. Using a scanning camera—Instead of multiple cameras, a single camera mounted on a mechanism capable of panning, translation, or rotation could scan a wider area. The captured images will be stitched and processed as usual.

The optically readable tags described above are suitable for a wide range of application such as inventory management for warehouses, stores, libraries, and similar venues where there is a need to quickly identify racks, shelves, bins, boxes, and packages.

The optically readable tags described above may be used in an electronic commerce fulfillment warehouse scenario.

Figure 9:
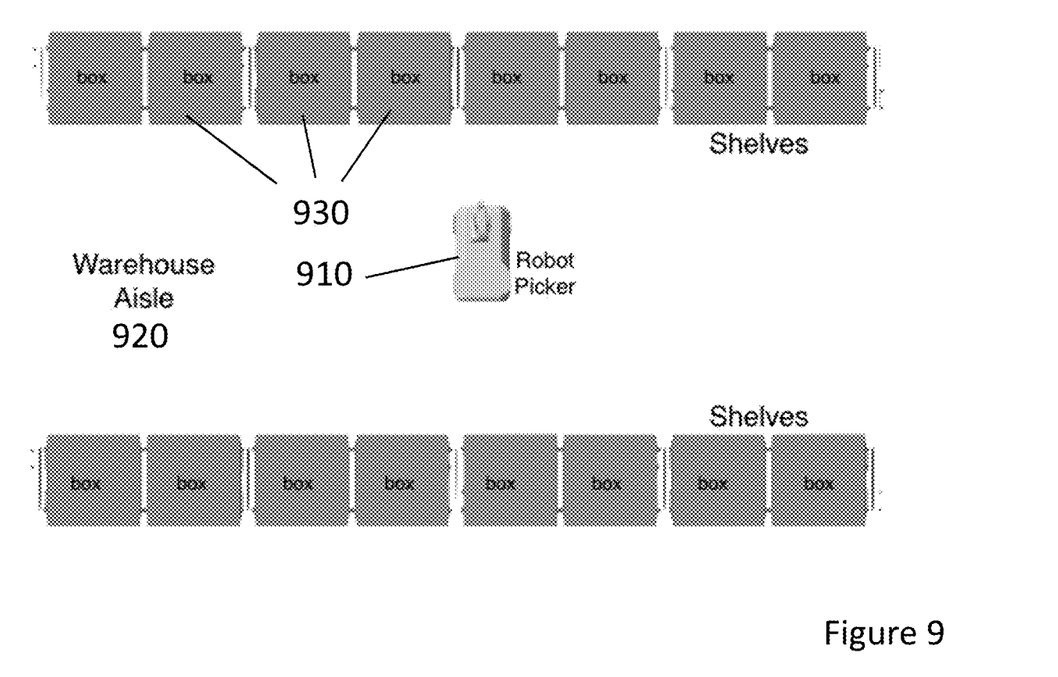
FIG. 9 illustrates a top-down view of an implementation in a warehouse scenario of optically readable tags according to an embodiment of the present invention.

FIG. 9 illustrates a top-down view of an implementation in a warehouse scenario of optically readable tags according to an embodiment of the present invention. As shown in FIG. 9, a robot picker 910 may move in a warehouse aisle 920 with shelves containing a plurality of boxes 930 arranged on the sides of the aisle 920. The robot picker 910 comprises a system for decoding optically readable tags such as that described above in relation to FIG. 3.

Figure 10:
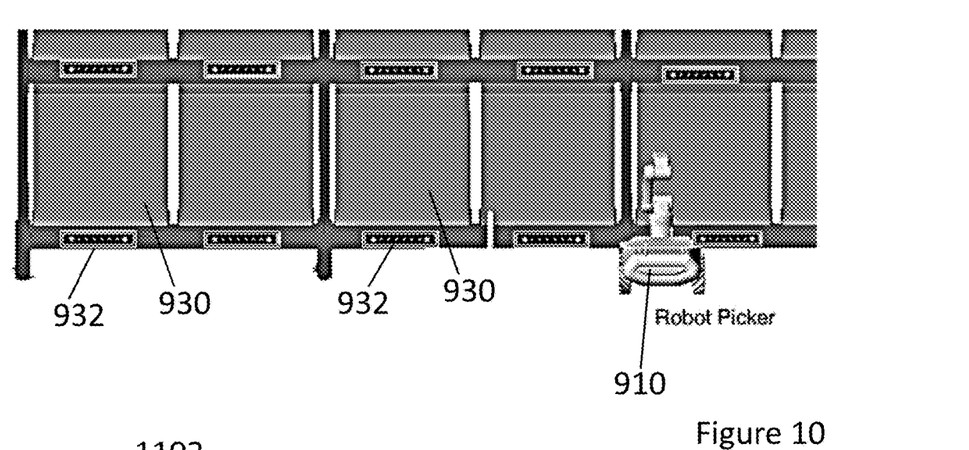
FIG. 10 illustrates a front view of an implementation in a warehouse scenario of optically readable tags according to an embodiment of the present invention.

FIG. 10 illustrates a front view of an implementation in a warehouse scenario of optically readable tags according to an embodiment of the present invention. As shown in FIG. 10 the boxes 930 located on the shelves have optically readable tags 932 which allow the robot picker 910 to identify and locate boxes 930.

As the robot picker 910 robot passes through the aisle 920, it can identify the boxes 930 to pick items from without a need to stop to focus its camera on the boxes' markers which are optically readable tags 932. Using the optically readable tags described above, all visible markers can be identified at once, making the box-identification process a more efficient. This makes for a faster mobile robotic picker 910 as the use of the optically readable tags 932 eliminates the requirement for complicated vision system. For example, there is no need to use zooming or camera rotation to focus. Once identified, the robot picker 910 could approach the target boxes 930 and pick the required item. It can then proceed to its next target item by identifying the next box.

The optically readable tags described above may be used in a library inventory monitoring scenario.

Figure 11:
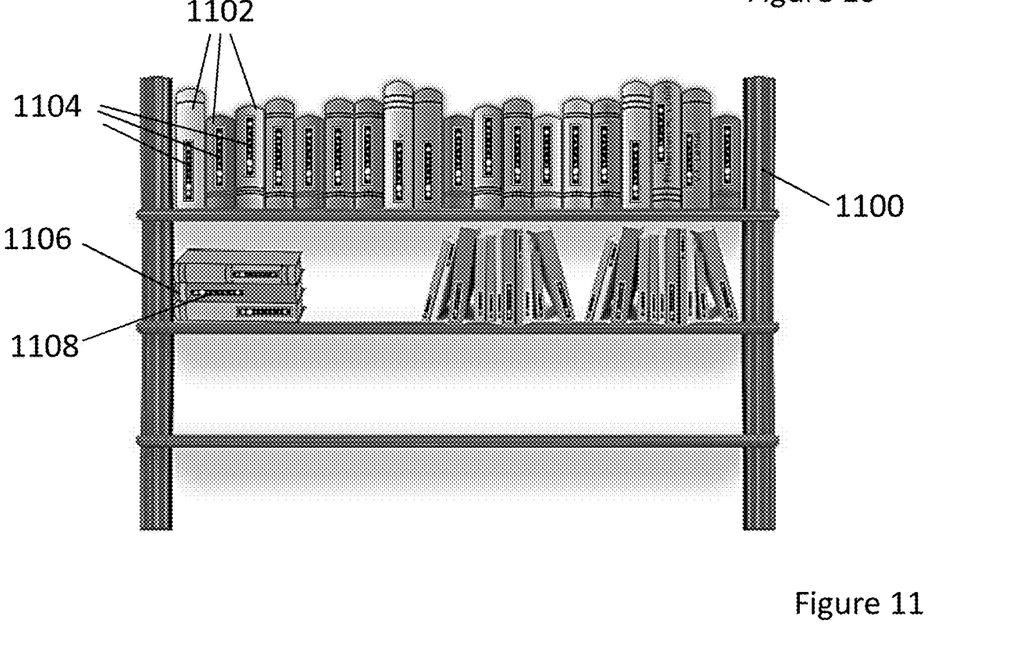
FIG. 11 illustrates an implementation in a library scenario of optically readable tags according to an embodiment of the present invention.

FIG. 11 illustrates an implementation in a library scenario of optically readable tags according to an embodiment of the present invention. As shown in FIG. 11, a plurality of books 1102 are arranged on a shelving unit 1100. Each of the books has an optically readable tag 1104 located on its spine. This allows for easy identification and inventory management of the books 1102. Currently, automated inventory of books on library shelves are only possible through expensive RFID readers mounted on mobile robots. When with the optically readable tags described herein, mobile robots mounted with inexpensive cameras could do an inventory of the library quickly. Even without a mobile robot, staff walking around the library aisles with hand-held cameras would suffice to conduct the inventory. It is further noted that even when the some of the books 1106 are arranged in a horizontal position, the optically readable tags 1108 located on the spine of the books 1106 can still be read from an image or sequence of images captured by a camera.

In addition to the e-commerce warehouse and library implementations discussed above, the optically readable tags could also be used for applications such as the following: small parts warehouse—to identify parts or boxes of parts automatically; pharmacy—to identify cartons of medicines automatically; outdoor areas—to identify stacks of supplies (like in construction firms) since it is noted that the optically readable tags may be used in ambient light.

Further, the optically readable tags may be used with specialized printing methods, such as transparent or luminescent markers, provided that a compatible vision sensor (IR camera, etc) is also used to decode the optically readable tags.

Whilst the foregoing description has described exemplary embodiments, it will be understood by those skilled in the art that many variations of the embodiments can be made within the scope and spirit of the present invention.

The invention claimed is:

1. An optically readable tag comprising;
a border region having an indicative outline shape; and
an encoding region, defined by the border region, the encoding region comprising a plurality of encoding shape objects, wherein data is encoded by relative sizes of the encoding shape objects, wherein data encoded on the optically readable tag is decoded based on determined relative sizes of the encoding shape objects.

2. An optically readable tag according to claim 1, wherein the border region comprises the indicative outline shape against a contrasting background.

3. An optically readable tag according to claim 1, wherein the border region encloses the encoding region.

4. An optically readable tag according to claim 1, wherein the encoding shape objects are circular objects.

5. An optically readable tag according to claim 1, wherein the data is encoded as binary data and the encoding shape objects have either a first size or a second size.

6. An optically readable tag according to claim 1, wherein the data is encoded as ternary data and the encoding shape objects have either a first size, a second size or a third size.

7. An optically readable tag according to claim 1, wherein the plurality of encoding shape objects comprises a reference marker and data is encoded by the sizes of the encoding shape objects relative to the reference marker.

8. An optically readable tag according to claim 7, wherein the reference marker indicates a start point of an encoding sequence of the encoding shape objects.

9. A method of decoding data encoded on an optically readable tag, the method comprising:
receiving an image of a scene comprising at least one optically readable tag;
identifying contours in the image;
detecting a border region having an indicative outline shape;
determining relative sizes of encoding shape objects within an encoding region defined by the border region; and
decoding data encoded on the optically readable tag from the relative sizes of the encoding shape objects.

10. A method according to claim 9, wherein detecting a border region comprises detecting the indicative outline shape.

11. A method according to claim 10, further comprising determining that a candidate region corresponding to the border region is an optically readable tag by determining a number of encoding shape objects within the encoding region and comparing the number of encoding shape objects with an expected number of encoding shape objects in an optically readable tag.

12. A method according to claim 9, wherein detecting a border region comprises identifying vertices of a border region having the indicative outline shape.

13. A method according to claim 9, wherein determining the relative sizes of the encoding shape objects comprises identifying a reference shape object and comparing the sizes of the encoding shape objects with the size of the reference shape object.

14. A computer readable medium carrying computer executable instructions which when executed on a processor cause the processor to carry out a method according to claim 9.

15. A system for decoding an optically readable tag, the system comprising a processor and a storage device, the storage device storing computer program instructions for causing the processor to:
- receive an image of a scene comprising at least one optically readable tag;
- identify contours in the image;
- detect a border region having an indicative outline shape;
- determine relative sizes of encoding shape objects within an encoding region defined by the border region; and
- decode data encoded on the optically readable tag from the relative sizes of the encoding shape objects.

16. A system according to claim 15, the storage device further storing computer program instructions for causing the processor to detect a border region by identifying a region having the indicative outline shape.

17. A system according to claim 16, the storage device further storing computer program instructions for causing the processor to determine that a candidate region corresponding to the border region is an optically readable tag.

18. A system according to claim 17, wherein the storage device further stores instructions executable by the processor to determine that the candidate region is an optically readable tag by determining a number of encoding shape objects within the encoding region and comparing the number of encoding shape objects with an expected number of encoding shape objects in an optically readable tag.

19. A system according to claim 15, the storage device further storing computer program instructions for causing the processor to detect a border region by identifying vertices of a border region having the indicative outline shape.

20. A system according to claim 19, wherein the storage device further stores instructions executable by the processor to determine the relative sizes of the encoding shape objects by identifying a reference shape object and comparing the sizes of the encoding shape objects with the size of the reference shape object.

* * * * *